3,522,234
MONOAZO DYES OF THE AZOBENZENE SERIES
Wolfgang Groebke, Oberwil, Basel-Land, Switzerland, assignor to Sandoz Ltd. (also known as Sandoz A.G.), Basel, Switzerland
No Drawing. Filed Sept. 20, 1967, Ser. No. 669,250
Claims priority, application Switzerland, Oct. 6, 1966, 14,455/66; Oct. 26, 1966, 15,532/66
Int. Cl. C07c 107/06; D06p 1/02
U.S. Cl. 260—207                                           4 Claims

ABSTRACT OF THE DISCLOSURE

Disperse dyes of the 2,4-dinitro-4'-amino-1,1'-azobenzene series bearing a halogen atom or a cyano or acylamino group as substituent in the 5-position produce dyeings with outstandingly good fastness properties on synthetic and semi-synthetic fibres made from high molecular organic materials.

DESCRIPTION

The new dyes are of the general formula

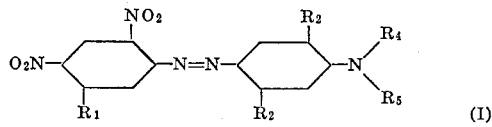

(I)

where $R_1$ stands for a halogen atom or a cyano or acylamino group, $R_2$ for a hydrogen atom, an alkyl or alkoxy group, $R_3$ for a hydrogen atom, an alkyl, alkoxy or acylamino group, $R_4$ for an alkyl group which may be substituted by halogen, hydroxyl, cyano, alkoxy, halogenalkoxy, acyl or acyloxy groups, and $R_5$ for a hydrogen atom, benzyl or an alkyl group which may be substituted by halogen, hydroxyl, cyano, alkoxy, halogenalkoxy, acyl or acyloxy groups, and in which the molecule may bear further substituents of common occurrence in dye chemistry, with the exception of free carboxylic acid and sulphonic acid groups.

Preferred dyes are of the formula

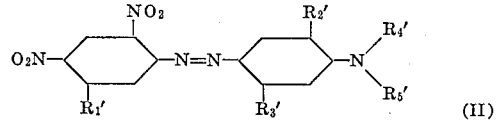

(II)

where $R_1'$ stands for a chlorine or bromine atom, a cyano, lower alkylcarbonylamino, lower chloro- or bromo-alkylcarbonylamino, lower alkylaminocarbonylamino or phenylaminocarbonylamino, $R_2'$ stands for a hydrogen atom or a lower alkyl or alkoxy group, $R_3'$ stands for a hydrogen atom, a lower alkyl, alkoxy, alkylcarbonylamino, alkylsulfonylamino or lower chloro- or bromo-alkylcarbonylamino group, $R_4'$ stands for an alkyl or alkoxy-hydroxyalkyl group having 1 to 4 carbon atoms, a lower hydroxyalkyl, cyanoalkyl, chloralkyl, bromalkyl, lower alkylcarbonyloxyalkyl, alkoxycarbonylalkyl or alkoxycarbonyloxyalkyl group, and $R_5'$ stands for a hydrogen atom, an alkyl group having 1 to 4 carbon atoms, a lower hydroxyalkyl, cyanoalkyl, chloralkyl, bromalkyl, lower alkylcarbonyloxyalkyl, alkoxycarbonylalkyl, alkylcarbonylalkyl, alkoxycarbonyloxyalkyl, alkoxyalkyl or alkylaminocarbonyloxyalkyl group.

In the present context the term "halogen" refers to chlorine or bromine, while "acyl" stands preferably for groups of formula —CO—R or —SO$_2$—R where R represents an alkyl or phenyl radical which may bear non-water-solubilizing substituents, in particular halogen atoms, cyano or alkoxy groups, the phenyl radicals also nitro or alkyl groups, and may be bound via an oxygen or —NH— bridge to the said —CO— group or directly to the —SO$_2$— group. Acyloxy stands for a group of formula —OCO—R where R has the aforestated significance. The R radical is generally an alkyl radical which contains one or two carbon atoms and may be substituted by halogen atoms. The alkyl and alkoxy groups contain 1 to 4, "lower" alkyl and alkoxy groups 1 or 2, carbon atoms.

The dyes produced in conformity with this invention have a higher standard of all-round fastness than the dyes disclosed in Swiss patent specification No. 343,560.

The new dyes are produced by diazotization of an amine of formula

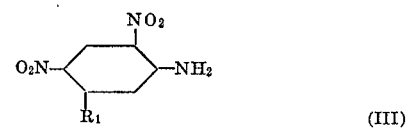

(III)

followed by coupling of the diazonium compound with a compound of formula

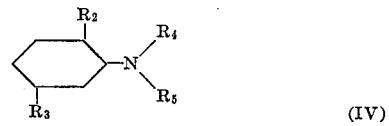

(IV)

The preferred dyes are produced in an analogous manner by diazotization of an amine of formula

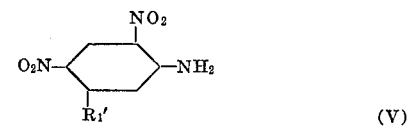

(V)

and coupling of the diazonium compound with a compound of formula

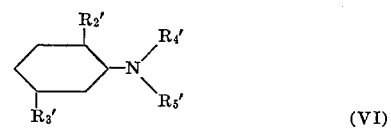

(VI)

The following are examples of preferred coupling components of Formula IV:

1-N,N-bis-(2'-acetoxyethyl)-amino-2-ethoxy-5-acetylaminobenzene,
1-N,N-bis-(2'-acetoxyethyl)-amino-2-ethoxy-5-propionylaminobenzene,
1-N,N-bis(2'-methoxycarbonylethyl)-amino-2-ethoxy-5-acetylaminobenzene,
1-N,N-bis-(2'-ethoxycarbonyloxyethyl)-amino-2-ethoxy-5-acetylaminobenzene,
1-N,N-bis-(2'-acetoxyethyl)-amino-2-ethoxy-5-ethoxycarbonylaminobenzene,
1-N,N-bis-(2'-chloracetoxyethyl)-amino-2-ethoxy-5-acetylaminobenzene, 1-(N-2'-cyanethyl-N-2'-acetoxyethyl)-amino-2-methoxy-5-acetylaminobenzene,
1-N,N-bis-(2'-chlorethyl)-amino-2-methoxy-5-acetylaminobenzene,
1-N,N-bis-(2'-acetoxyethyl)-amino-5-ethoxycarbonylaminobenzene,
1-(N-2'-cyanethyl-N-2'-hydroxyethyl)-amino-2-ethoxy-5-acetylaminobenzene,
1-(N-2'-cyanethyl-N-2'-acetoxyethyl)-amino-5-propionylaminobenzene,
1-(N-2'-cyanethyl-N-2'-ethoxycarbonyloxyethyl)-amino-5-methylsulphonylaminobenzene,
1-(N-ethyl-N-2'-ethoxycarbonylethyl)-amino-5-acetylaminobenzene,
1-N,N-bis-(ethyl)-amino-3-chloropropionylaminobenzene,
1-(N-ethyl-N-2'-cyanethyl)-amino-3-acetylaminobenzene,
1-(N-cyanethyl-N-2'-hydroxyethyl)-amino-3-acetylaminobenzene,
1-(N-cyanethyl-N-2'-acetoxyethyl)-amino-3-acetylaminobenzene,
1-(N-cyanethyl-N-2'-ethyliminocarbonyloxyethyl)-amino-3-acetylaminobenzene,
1-(N-cyanethyl-N-2'-acetoxyethyl)-amino-3-methylbenzene and
1-(N-cyanethyl-N-2'-ethyliminocarbonyloxyethyl)-amino-3-methylbenzene.

Diazotization is effected preferably in sulphuric acid or phosphoric acid solution or suspension by means of sodium nitrite and in the temperature range of 0 to 20° C., with the further addition, if required, of a lower aliphatic carboxylic acid, such as acetic or propionic acid.

The coupling reaction is generally conducted in acid medium, buffered if necessary with, e. g., sodium acetate, and with cooling at temperatures of 0 to 5° C.

It is advantageous to convert the new dyes into dye preparations before use, employing for this purpose one of the standard methods, such as grinding in the presence of dispersing agents and/or fillers. The resulting preparations are dried in a jet or vacuum drier. After dispersion in an appropriate volume of water, they are applicable by dyeing, padding and printing techniques at long or short liquor ratio.

From aqueous dispersion the dyes build up excellently on fibres or textiles of hydrophobic synthetic or regenerated fibres made of organic high molecular materials. They are particularly suitable for dyeing and printing cellulose acetate and triacetate, linear aromatic polyester and polyamide fibres. They also dye polyolefins.

The known dyeing and printing methods are used, for example the process described in French Pat. 1,445,371.

The dyeings obtained are of red to blue shade and have excellent fastness to heat (i.e. sublimation, thermofixation and pleating), burnt gas fumes, cross dyeing, dry cleaning and chlorine, and to wet treatments such as water, washing and perspiration. They are stable to the various forms of permanent press finishing. The dyes withstand bath temperatures up to at least 220° C. without detrimental effect, being particularly stable at 80–140° C. This stability is not adversely affected by the liquor ratio or the presence of accelerants. They reserve wool and cotton well and the dyeings have good dischargeability. The light fastness even of pale shades is excellent, hence the dyes are well suitable as components for fashionable pastel combination shades.

The blue dyes of the present invention are suitable for combination with small amounts of red dyes for the production of low-cost navy blue dyeings which are dischargeable and fast to light, washing, perspiration, chlorine, sublimation, pleating and thermofixation. Combinations with red and yellow dyes give fast black dyeings.

In the examples the parts and percentages are by weight and the temperatures in degrees centigrade.

Example 1

7 parts of sodium nitrite are added to 155 parts of sulphuric acid at 70°, followed at 15–20° by 100 parts of glacial acetic acid and 22 parts of 1-amino-3-chloro-4,6-dinitrobenzene. After 2 hours the resulting diazonium salt solution is run into a solution of 37 parts of 1-N,N-bis - (2'-acetoxyethyl)-amino-2-ethoxy-5-acetylaminobenzene and 5 parts of aminosulphonic acid in 60 parts of glacial acetic acid and 100 parts of ice water. The coupling reaction is completed by the addition of sodium acetate to bring the pH to 4. The dye formed is suctioned off, washed free of acid and dried. On recrystallization from glacial acetic acid it melts at 181° and dyes polyester fibres in blue shades with good fastness properties. This dye is faster to lubricants and dry heat (thermofixation) than the analogous dye having the halogen atom in ortho position to the azo bridge.

Example 2

A diazonium salt solution prepared as detailed in Example 1 is combined with a solution of 34 parts of 1-N,N-bis - (2' - acetoxyethyl)-amino-3-propionylaminobenzene and 5 parts of aminosulphonic acid in 60 parts of glacial acetic acid and 100 parts of ice water. The coupling reaction is terminated by adjusting the pH to 4 with sodium acetate, on which the dye is suctioned off, washed free of acid and dried. After recrystallization from an alcohol/glacial acetic acid mixture, it melts at 155° and gives dyeings of bordeaux shade and good fastness on polyester fibres. This dye is faster to light than its analogue with the chlorine atom in ortho position to the azo bridge.

Example 3

24 parts of 1-amino-3-acetamino-4,6-dinitrobenzene are diazotized for 2 hours at 15° in 158 parts of nitrosylsulfuric acid and 100 parts of glacial acetic acid, the former being prepared with 155 parts of sulphuric acid and 7 parts of sodium nitrite. The diazonium salt solution is then combined with a solution of 37 parts of 1-N,N-bis-(2'-acetoxyethyl)-amino - 2 - ethoxy-5-acetylaminobenzene and 5 parts of aminosulphonic acid in 60 parts of glacial acetic acid and 100 parts of ice water. Coupling is completed by adjusting to pH 4, following which the dye is filtered off, washed free of acid and dried. Recrystallized from glacial acetic acid, it melts at 202° C. It gives blue dyeings of good all-round fastness on polyester fibres.

The dye formed with diazotized 2,4-dinitro-6-chloro-1-aminobenzene and the same coupling component is less fast to dry heat (thermofixation) than the dye of this example.

Example 4

A diazonium salt solution prepared as given in Example 3 is run into a solution of 34 parts of 1-N,N-bis - (2' - acetoxyethyl)-amino-3-propionylaminobenzene and 5 parts of aminosulphonic acid in 60 parts of glacial acetic acid and 100 parts of ice water. The coupling reaction is brought to a close by adding sodium acetate to the pH value of 4. The dye settles out and is suctioned off, washed with water and dried. On recrystallization from dioxane its melting point is 218° C. It gives violet dyeings of good all-around fastness on polyester fibres.

This dye has higher fastness to light and thermofixation than the dye synthesized with diazotized 2,4-dinitro-6-chloro - 1 - amino-benzene and 1 - N,N,-bis-(2'-acetoxyethyl)-amino-3-propionylaminobenzene.

The dyes listed in the table below are produced in accordance with the procedure of Example 1. The symbols bear the significance assigned to them under Formula I.

| Example No. | $R_1$ | $R_2$ | $R_3$ | $R_4$ | $R_5$ | Shade on Polyester Fibers |
|---|---|---|---|---|---|---|
| 5 | —Cl | —OC₂H₅ | —NHCOCH₃ | —CH₂CH₂OCOOCH₃ | —CH₂CH₂OCOOCH₃ | Reddish Blue. |
| 6 | —Cl | —H | —NHCOC₂H₅ | —CH₂CH₂OCOOCH₃ | —CH₂CH₂OCOOCH₃ | Bordeaux. |
| 7 | —Cl | —OCH₃ | —NHCOCH₃ | —CH₂CH₂Cl | —CH₂CH₂Cl | Reddish blue. |
| 8 | —Cl | —H | —HNCOC₂H₅ | —CH₂CH₂Cl | —CH₂CH₂Cl | Bordeaux. |
| 9 | —Cl | —OC₂H₅ | —NHSO₂CH₃ | —CH₂CH₂CN | CH₂CH₂OCOCH₃ | Reddish blue. |
| 10 | —Cl | —H | —NHSO₂CH₃ | —CH₂CH₂CN | CH₂CH₂OCOCH₃ | Bordeaux. |
| 11 | Br | —OCH₃ | —HNCOCH₃ | —CH₂CH₂OCOCH₃ | CH₂CH₂OCOCH₃ | Reddish blue. |
| 12 | Br | —H | —NHCOCH₃ | —CH₂CH₂OCOCH₃ | CH₂CH₂OCOCH₃ | Bordeaux. |
| 13 | Cl | —H | —NHCOCH₂CH₂Cl | —C₂H₅ | —C₂H₅ | Do. |
| 14 | Cl | —H | —H | —CH₂CH₂CN | —CH₂CH₂OCONHC₂H₅ | Rubine. |
| 15 | —CN | —OC₂H₅ | —NHCOCH₃ | —CH₂CH₂OCOCH₃ | —CH₂CH₂OCOCH₃ | Reddish blue. |
| 16 | —CN | —H | —NHCOCH₃ | —CH₂CH₂OCOCH₃ | —CH₂CH₂OCOCH₃ | Bordeaux. |
| 17 | —Cl | —H | —CH₃ | —CH₂CH₂CN | —CH₂CH₂OCOCH₃ | Do. |
| 18 | —Cl | —H | —CH₃ | —CH₂CH₂CN | —CH₂CH₂OCONHC₂H₅ | Do. |
| 19 | —NHCOCH₃ | —H | —H | —CH₂CH₂OCOCH₃ | —CH₂CH₂CN | Do. |
| 20 | —NHCOCH₃ | —H | —NHCOCH₂CH₂Cl | —C₂H₅ | —C₂H₅ | Reddish blue. |
| 21 | —NHCONHC₂H₅ | —H | —NHCOCH₃ | —CH₂CH₂CN | —CH₂CH₂OCOCH₃ | Do. |
| 22 | —NHCONHC₂H₅ | —OC₂H₅ | —HNCOCH₃ | —CH₂CH₂CN | —CH₂CH₂OCOCH₃ | Blue. |
| 23 | —NHCOCH₃ | —H | —H | —CH₂CH₂CN | —CH₂CH₂OCONHC₂H₅ | Bordeaux. |
| 24 | —NHCOCH₃ | —H | —H | —CH₂CH₂CN | —CH₂CH₂OCOCH₃ | Do. |
| 25 | —NHCOCH₃ | —H | —CH₃ | —CH₂CH₂CN | —CH₂CH₂OCOCH₃ | Violet. |
| 26 | —NHCOCH₃ | —H | —CH₃ | —CH₂CH₂CN | —CH₂CH₂OCONHC₂H₅ | Do. |
| 27 | —NHCOCH₃ | —H | —NHCOCH₂CH₂Cl | —C₂H₅ | —C₂H₅ | Reddish blue. |
| 28 | —NHCOCH₃ | —OCH₃ | —NHCOCH₂CH₂Cl | —C₂H₅ | —C₂H₅ | Greenish blue. |
| 29 | —NHCOCH₃ | —OCH₃ | —NHCOCH₃ | —C₂H₅ | —C₂H₅ | Do. |
| 30 | —NHCOCH₃ | —H | —OCH₃ | —CH₂CH₂CN | —CH₂CH₂OCOCH₃ | Violet. |
| 31 | —NHCOCH₃ | —H | —OCH₃ | —CH₂CH₂OCOCH₃ | —CH₂CH₂OCOCH₃ | Do. |
| 32 | —NHCOCH₃ | —CH₃ | —NHCOCH₃ | —CH₂CH₂OCOCH₃ | —CH₂CH₂OCOCH₃ | Blue. |
| 33 | —NHCOCH₃ | —OC₂H₅ | —NHCOCH₃ | —CH₂CH₂COOCH₃ | —H | Do. |
| 34 | —NHCOCH₃ | —OC₂H₅ | —NHCOCH₃ | —CH₂CH₂CH₃ | —CH₂CH₂CH₃ | Greenish blue. |
| 35 | —NHCOCH₃ | —OC₂H₅ | —NHCOCH₃ | —CH₂CH₂CN | —CH₃ | Blue. |
| 36 | —NHCOCH₃ | —OC₂H₅ | —NHCOCH₃ | —CH₂CH₂CN | —CH₂CH₂Br | Do. |
| 37 | —NHCOCH₃ | —OC₂H₅ | —NHCOCH₃ | —CH₂CH₂CN | —CH₂CH₂OH | Do. |
| 38 | —NHCOCH₃ | —OC₂H₅ | —NHCOCH₃ | —CH₂CH₂CN | —CH₂CH₂OCH₃ | Do. |
| 39 | —NHCOCH₃ | —OC₂H₅ | —NHCOCH₃ | —CH₂CH₂CN | —CH₂CH₂COCH₃ | Do. |
| 40 | —NHCOCH₃ | —OC₂H₅ | —NHCOCH₃ | —CH₂CH₂OCOCH₃ | —CH₂CH₂COCH₃ | Do. |
| 41 | —NHCONHC₆H₅ | —OC₂H₅ | —NHCOCH₃ | —C₂H₅ | —C₂H₅ | Do. |
| 42 | —NHCONHC₆H₅ | —OC₂H₅ | —NHCOCH₃ | —CH₂CH₂OCOCH₃ | —CH₂CH₂OCOCH₃ | Do. |
| 43 | —NHCOCH₂CH₂Cl | —OC₂H₅ | —NHCOCH₃ | —CH₂CH₂OCOCH₃ | —CH₂CH₂OCOCH₃ | Do. |
| 44 | —NHCOCH₂CH₂Cl | —OC₂H₅ | —NHCOCH₃ | —C₂H₅ | —C₂H₅ | Greenish blue. |
| 45 | —NHCOCH₂CH₂Cl | —H | —NHCOCH₃ | —C₂H₅ | —C₂H₅ | Reddish blue. |
| 46 | —NHCOCH₂CH₂Cl | —H | —NHCOCH₃ | —CH₂CH₂OH | —CH₂CH₂OH | Violet. |
| 47 | —NHCOCH₂CH₂Cl | —H | —NHCOCH₃ | —CH₂CH₂OCOCH₃ | —CH₂CH₂OCOCH₃ | Do. |
| 48 | —NHCOCH₂CH₂Br | —H | —NHCOCH₃ | —C₂H₅ | —C₂H₅ | Reddish blue. |
| 49 | —NHCOCH₂CH₂Br | —OC₂H₅ | —NHCOCH₃ | —CH₂CH₂OH | —CH₂CH₂OH | Violet. |
| 50 | —NHCOCH₂CH₂Br | —OC₂H₅ | —NHCOCH₃ | —CH₂CH₂OCOCH₂ | —CH₂CH₂OCOCH₃ | Do. |
| 51 | —NHCOCH₃ | —H | —NHCOCH₂CH₂Br | —C₂H₅ | —C₂H₅ | Reddish blue. |
| 52 | —NHCOCH₂CH₂Br | —OC₂H₅ | —NHCOCH₃ | —C₂H₅ | —C₂H₅ | Greenish blue. |
| 53 | —NHCOC₂H₅ | —OC₂H₅ | —NHCOCH₃ | —C₂H₅ | —C₂H₅ | Do. |
| 54 | —NHCOC₂H₅ | —OC₂H₅ | —NHCOCH₃ | —CH₂CH₂OCOCH₃ | —CH₂CH₂OCOCH₃ | Blue. |
| 55 | —NHCOC₂H₅ | —H | —NHCOCH₃ | —CH₂CH₂OCOCH₃ | —CH₂CH₂OCOCH₃ | Violet. |
| 56 | —NHCOC₂H₅ | —H | —NHCOCH₃ | —C₂H₅ | —C₂H₅ | Reddish blue. |
| 57 | —NHCOC₂H₅ | —H | —NHCOCH₃ | —CH₂CH₂OH | —CH₂CH₂OH | Violet. |
| 58 | —NHCOCH₃ | —C₂H₅ | —NHCOCH₃ | —CH₂CH₂OCOCH₃ | —CH₂CH₂OCOCH₃ | Blue. |
| 59 | —NHCOCH₃ | —H | —C₂H₅ | —CH₂CH₂CN | —CH₂CH₂OCOCH₃ | Violet. |
| 60 | —NHCOCH₃ | —H | —OC₂H₅ | —CH₂CH₂CN | —CH₂CH₂OCOCH₃ | Do. |
| 61 | —NHCOCH₃ | —OC₂H₅ | —NHCOCH₃ | —CH₂CH₂Cl | —CH₂CH₂CN | Blue. |
| 62 | —NHCOCH₃ | —OC₂H₅ | —NHCOCH₃ | —CH₂CH₂Cl | —CH₂CH₂Cl | Do. |
| 63 | —NHCOCH₃ | —OC₂H₅ | —NHCOCH₃ | —CH₂CH₂Br | —CH₂CH₂Br | Do. |
| 64 | —Cl | —OC₂H₅ | —NHCOCH₃ | —CH₂CHOHCH₂OCH₃ | H | Do. |
| 65 | —NHCOCH₃ | —OC₂H₅ | —NHCOCH₃ | —CH₂CHOHCH₂OCH₃ | H | Do. |
| 66 | —NHCOCH₂CH₃ | —OC₂H₅ | —NHCOCH₃ | —CH₂CHOHCH₂OCH₃ | H | Do. |
| 67 | —Br | —OC₂H₅ | —NHCOCH₃ | —CH₂CHOHCH₂OCH₃ | H | Do. |
| 68 | —NHCOCH₃ | —CH₃ | —NHCOCH₃ | —CH₂CH₂OCOOCH₃ | CH₂C₆H₅ | Do. |
| 69 | —NHCOCH₃ | —OCH₃ | —NHCOCH₃ | —CH₂CH₂OCOOCH₃ | CH₂C₆H₅ | Do. |

APPLICATION EXAMPLES (A) A mixture of 7 parts of the dye produced according to Example 1, 4 parts of sodium dinaphthylmethanedisulphonate, 4 parts of sodium cetyl sulphate and 5 parts of anhydrous sodium sulphate is ground in a ball mill for 48 hours. A fine powder is obtained, 1 part of which is dispersed in a little water. The dispersion is added through a sieve to a dyebath of 4000 parts of water and 2 parts of sodium lauryl sulphate. The liquor to goods ratio is 40:1. 100 parts of a scoured fabric of polyester fibre are entered into the bath at 40–50°, after which 20 parts of a water emulsion of a chlorinated benzene are added. The bath is raised slowly to 100° and held for 1–2 hours at 95–100°, then the fabric is removed, rinsed, soaped, rinsed again and dried. A level blue dyeing is obtained which is very fast to light, cross dyeing, washing, water, sea water, perspiration, sublimation, gas fumes, thermofixation, pleating and permanent press finishing.

(B) A mixture of 30 parts of the dye produced as described in Example 2, 40 parts of sodium dinaphthylmethanedisulphonate, 50 parts of sodium cetyl sulphate and 50 parts of anhydrous sodium sulphate is ground to a fine powder in a ball mill. 4 parts of the powder are dispersed in 1000 parts of water and into this dyebath at 40–50 are entered 100 parts of a scoured polyester fabric. The dyebath is raised slowly to 130° and dyeing continued for 1 hour at this temperature under pressure, with subsequent rinsing, soaping, rinsing and drying. The resulting bordeaux dyeing has the same fastness properties as the dyeing of Example A.

(C) A mixture of 20 parts of the dye of Example 1, 55 parts of sulphite cellulose waste lye and 800 parts of water is ground in a ball mill until the dye particles are reduced in size to less than 1 micron. This colloidal solution is mixed with 25 parts of ethylene diglycol monobutyl ether and 400 parts of 6% carboxyl methyl cellulose to give a paste which is highly suitable for the Vigoreux printing of polyester slubbing. The slubbing is printed with two rollers giving a coverage of 78% and without intermediate drying is steamed at 120°. Blue prints having good fastness properties are obtained.

(D) A mixture of 7 parts of the dye of Example 3, 13 parts of sulphite cellulose waste lye and 100 parts of water is ground in a ball mill and the resulting paste jet dried. 4 parts of the paste are dispersed in a little water and added through a sieve to a bath of 4000 parts of water and 4 parts of N-oleyl-N'-hydroxyethyl-N'-(3'-sulpho-2'-hydroxypropyl)-ethylenediamine. 100 parts of a fabric of nylon 66 polyamide fibre are introduced into the dyebath at 20°, the temperature is increased to 100° in 30 minutes and dyeing continued for 1 hour at 100°. The blue dye obtained is rinsed and dried. It gives a level blue dyeing with good fastness to light, cross dyeing, washing, water, sea water, perspiration, sublimation and rubbing.

Representative dyes of the foregoing examples are as follows:

Example 1

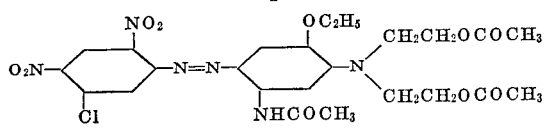

Example 2

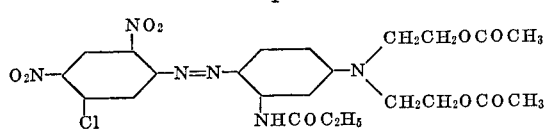

Example 3

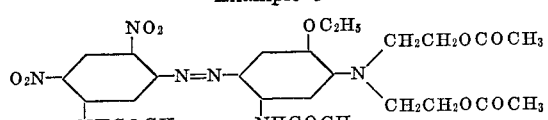

Example 4

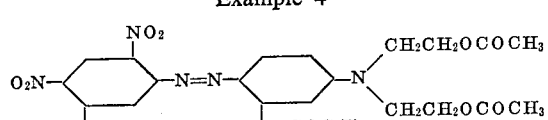

Example 5

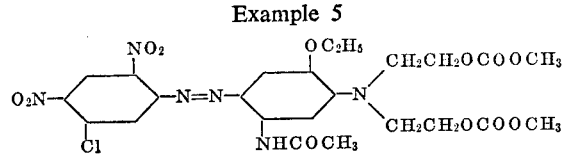

Having thus disclosed the invention what I claim is:
1. Dye of the formula

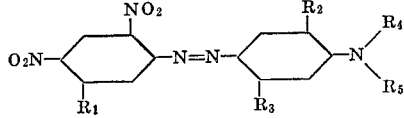

wherein
$R_1$ is acylamino;
$R_2$ is a member selected from the group consisting of a hydrogen atom, alkyl and alkoxy;
$R_3$ is a member selected from the group consisting of a hydrogen atom, alkyl, alkoxy, alkylsulfonylamino, alkylcarbonylamino, chloroalkylcarbonylamino and bromoalkylcarbonylamino;
$R_4$ is a member selected from the group consisting of alkyl, chloroalkyl, bromoalkyl, hydroxyalkyl, cyanoalkyl, alkoxyalkyl, chloroalkoxyalkyl, bromoalkoxyalkyl, alkylcarbonylalkyl, alkoxycarbonylalkyl, alkoxycarbonyloxyalkyl, and alkylcarbonyloxyalkyl;
$R_5$ is a member selected from the group consisting of a hydrogen atom, alkyl, chloroalkyl, bromoalkyl, hydroxyalkyl, cyanoalkyl, alkoxyalkyl, benzyl, alkylcarbonylalkyl, alkoxycarbonylalkyl, alkoxycarbonyloxyalkyl, alkylcarbonyloxyalkyl and alkylaminocarbonyloxyalkyl;
acyl is a member selected from the group consisting of —CO—R and —CO—NH—R;
R is a member selected from the group consisting of alkyl, chloroalkyl, bromoalkyl and phenyl;
each alkyl contains from 1 to 4 carbon atoms; and
each alkoxy contains from 1 to 4 carbon atoms.

2. Dye according to claim 1 wherein
$R_1$ is a member selected from the group consisting of lower alkylcarbonylamino, chloro(lower)alkylcarbonylamino, bromo(lower)alkylcarbonylamino, lower alkylaminocarbonylamino and phenylaminocarbonylamino;
$R_2$ is a member selected from the group consisting of a hydrogen atom, lower alkyl and lower alkoxy;
$R_3$ is a member selected from the group consisting of a hydrogen atom, lower alkyl, lower alkoxy, lower alkylcarbonylamino, lower alkylsulfonylamino, chloro(lower)alkylcarbonylamino and bromo(lower)alkylcarbonylamino;
$R_4$ is a member selected from the group consisting of alkyl, alkoxyhydroxyalkyl having up to 4 carbon atoms, hydroxy(lower)alkyl, cyano(lower)alkyl, chloro(lower)alkyl, bromo(lower)alkyl, lower alkylcarbonyloxy(lower)alkyl, lower alkoxycarbonyl(lower)alkyl and lower alkoxycarbonyloxy(lower)alkyl;
$R_5$ is a member selected from the group consisting of a hydrogen atom, alkyl, hydroxy(lower)alkyl, cyano(lower)alkyl, chloro(lower)alkyl, bromo(lower)alkyl, benzyl, lower alkylcarbonyloxy(lower)alkyl, lower alkoxycarbonyl(lower)alkyl, lower alkylcarbonyl(lower)alkyl, lower alkoxycarbonyloxy(lower)alkyl, lower alkoxy(lower)alkyl and lower alkylaminocarbonyloxy(lower)alkyl; and
each of lower alkyl and lower alkoxy contains from 1 to 2 carbon atoms.

3. The dye according to claim 1 of the formula

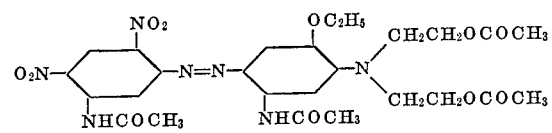

4. The dye according to claim 1 of the formula

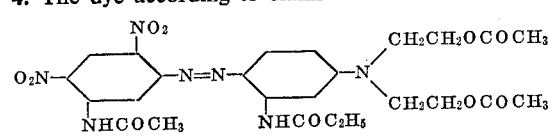

References Cited

UNITED STATES PATENTS

| | | | |
|---|---|---|---|
| 3,178,405 | 4/1965 | Merian | 260—207 |
| 3,250,763 | 5/1966 | Gies et al. | 260—207 |
| 3,268,507 | 8/1966 | Kruckenberg | 260—207 |
| 3,342,803 | 9/1967 | Artz et al. | 260—207 |
| 3,342,804 | 9/1967 | Mueller | 260—207.1 |
| 3,406,164 | 10/1968 | Altermatt et al. | 260—207 |
| 3,406,165 | 10/1968 | Kruckenberg | 260—207.1 |
| 3,407,189 | 10/1968 | Merian | 260—207.1 |

CHARLES B. PARKER, Primary Examiner

D. M. PAPUGA, Assistant Examiner

U.S. Cl. X.R.

8—41, 55; 260—207, 207.1, 207.5, 463, 465, 471